US012714958B2

(12) United States Patent
Seong et al.

(10) Patent No.: US 12,714,958 B2
(45) Date of Patent: Aug. 25, 2026

(54) COMPOSITE FOR AIR PURIFICATION, METHOD OF MANUFACTURING THE SAME, AND FILTER INCLUDING THE SAME

(71) Applicants: Hyundai Motor Company, Seoul (KR); Kia Corporation, Seoul (KR); University of Seoul Industry Cooperation Foundation, Seoul (KR)

(72) Inventors: Kwang Mo Seong, Bucheon-Si (KR); Jung Sik Kim, Seoul (KR)

(73) Assignees: Hyundai Motor Company, Seoul (KR); Kia Corporation, Seoul (KR); University of Seoul Industry Cooperation Foundation, Seoul (KR)

( * ) Notice: Subject to any disclaimer, the term of this patent is extended or adjusted under 35 U.S.C. 154(b) by 795 days.

(21) Appl. No.: 18/077,694

(22) Filed: Dec. 8, 2022

(65) Prior Publication Data

US 2023/0364539 A1 Nov. 16, 2023

(30) Foreign Application Priority Data

May 12, 2022 (KR) ........................ 10-2022-0058508

(51) Int. Cl.

| | |
|---|---|
| ***B01D 39/20*** | (2006.01) |
| ***B01J 21/06*** | (2006.01) |
| ***B01J 21/08*** | (2006.01) |
| ***B01J 27/24*** | (2006.01) |
| ***B01J 35/00*** | (2006.01) |

(Continued)

(52) U.S. Cl.

CPC ........ *B01D 39/2051* (2013.01); *B01J 21/063* (2013.01); *B01J 21/08* (2013.01); *B01J 27/24* (2013.01); *B01J 35/19* (2024.01); *B01J 35/39* (2024.01); *B01J 35/60* (2024.01); *B01J 37/0225* (2013.01); *B01J 37/0244* (2013.01); *B01J 37/08* (2013.01); *B01J 37/18* (2013.01); *B01D 2239/0471* (2013.01); *B01D 2258/06* (2013.01);

(Continued)

(58) Field of Classification Search

CPC . B01D 39/20; B01J 21/06; B01J 21/08; B01J 27/24; B01J 35/00; B01J 35/10; B01J 37/02; B01J 37/08; B01J 37/18

See application file for complete search history.

(56) References Cited

FOREIGN PATENT DOCUMENTS

| | | | |
|---|---|---|---|
| CN | 108889332 | A | 11/2018 |
| JP | 4033214 | B2 | 1/2008 |

(Continued)

OTHER PUBLICATIONS

Mavengere et al. "Photocatalytic Properties of g-C3N4-Supported on the SrAl2O4:Eu, Dy/SiO2" Coatings, 2020, 10, 917 (Year: 2020).*

(Continued)

*Primary Examiner* — Sharon Pregler
(74) *Attorney, Agent, or Firm* — Banner & Witcoff, Ltd.

(57) ABSTRACT

Disclosed herein are a composite for air purification, a filter including the same, and a method of manufacturing the same. The composite for air purification includes a porous support, a first coating layer disposed on a surface of the porous support and including a long-lasting phosphor, a second coating layer disposed on a surface of the first coating layer and including silica ($SiO_2$), and a third coating layer disposed on a surface of the second coating layer and including a photocatalyst.

20 Claims, 7 Drawing Sheets

(51) Int. Cl.
*B01J 35/39* (2024.01)
*B01J 35/60* (2024.01)
*B01J 37/02* (2006.01)
*B01J 37/08* (2006.01)
*B01J 37/18* (2006.01)

(52) U.S. Cl.
CPC ........ *B01J 2523/41* (2013.01); *B01J 2523/47* (2013.01)

(56) References Cited

FOREIGN PATENT DOCUMENTS

| | | | |
|---|---|---|---|
| KR | 10-2017-0026966 | A | 3/2017 |
| KR | 10-2020-0061826 | A | 6/2020 |
| KR | 102309218 | B1 | 10/2021 |

OTHER PUBLICATIONS

Xiong et al. "Porous g-C3N4/TiO2 foam photocatalytic filter for treating NO indoor gas." : Environ. Sci.: Nano, 2021, 8, 1571 (Year: 2021).*

Hu et al. "TiO2/SiO2 Composite Films Immobilized on Foam Nickel Substrate for the Photocatalytic Degradation of Gaseous Acetaldehyde." International Journal of Photoenergy. vol. 2008, Article ID 679421. (Year: 2008).*

Zhu et al. "First-principle calculation study of tri-s-triazine-based g-C3N4: A review." Applied Catalysis B: Environmental. vol. 224, May 2018, pp. 983-999 (Year: 2018).*

Nov. 4, 2024—(KR) Korean Office Action—App. No. 10-2022-0058508.

* cited by examiner

Figure 6:
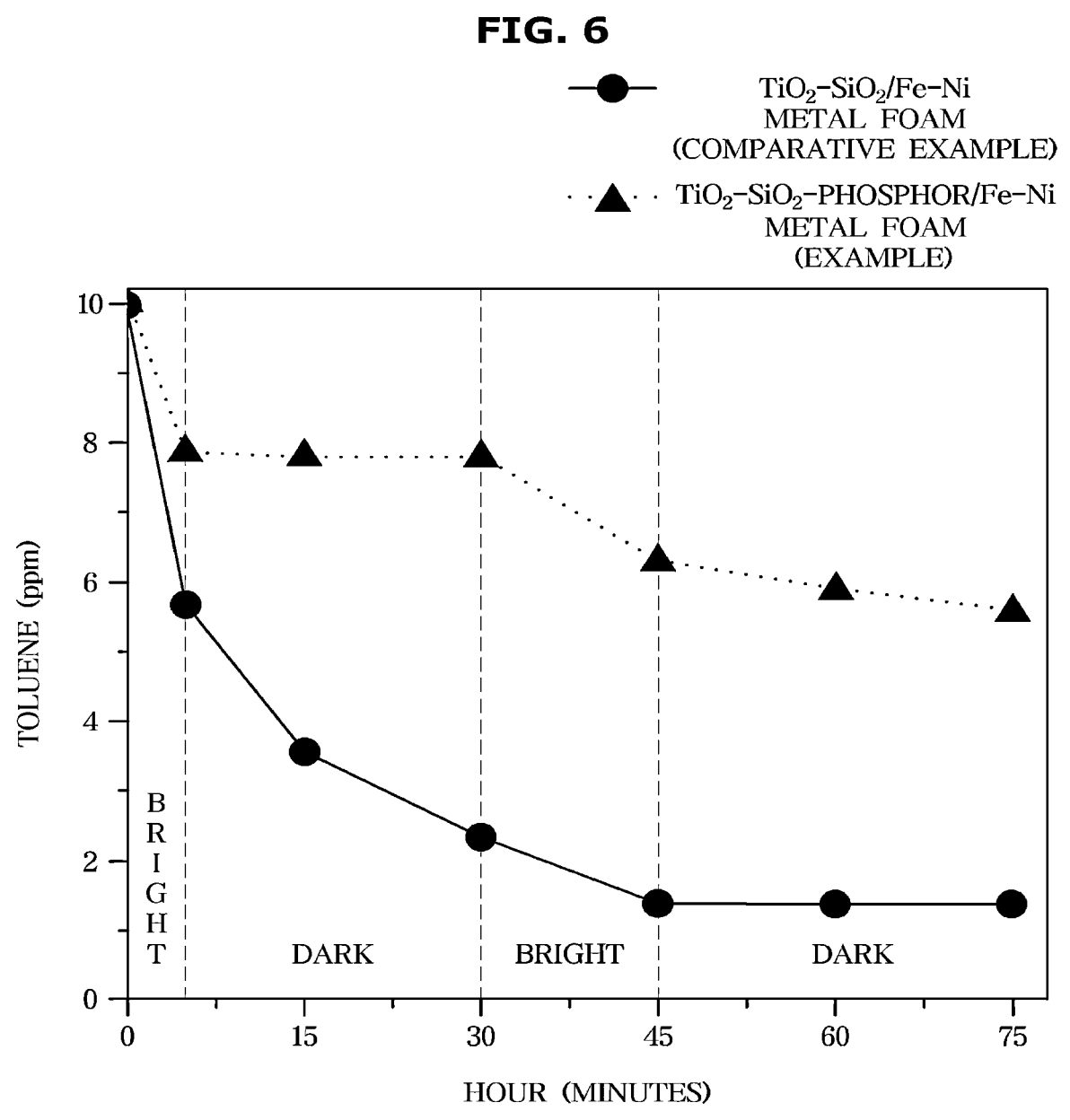

$TiO_2$-$SiO_2$/Fe-Ni METAL FOAM (COMPARATIVE EXAMPLE)

$TiO_2$-$SiO_2$-PHOSPHOR/Fe-Ni METAL FOAM (EXAMPLE)

TOLUENE (ppm)

10
8
6
4
2
0

BRIGHT
DARK
BRIGHT
DARK 0 15 30 45 60 75

HOUR (MINUTES)

COMPOSITE FOR AIR PURIFICATION, METHOD OF MANUFACTURING THE SAME, AND FILTER INCLUDING THE SAME

CROSS-REFERENCE TO RELATED APPLICATION

This application claims the benefit of Korean Patent Application No. 10-2022-0058508, filed on May 12, 2022 in the Korean Intellectual Property Office, the disclosure of which is incorporated herein by reference.

BACKGROUND

1. Field

The present disclosure relates to a composition for air purification, a filter including the composite for air purification, and a method of manufacturing the composite for air purification.

2. Discussion of the Background

As air pollution such as yellow dust intensifies, there is an increasing demand for air purification systems (air purifiers, air purification devices, and the like) for improving indoor air quality. Therefore, various studies are being actively conducted on methods which may effectively purify indoor air polluted with various air pollutants, automobile exhaust gases, volatile organic compounds (VOCs) harmful gases, odors, viruses, and the like, and among these studies, techniques of purifying air using photocatalyst materials with a strong photolysis function have aroused great interest.

Titanium dioxide ($TiO_2$) known as a representative photocatalyst material may generate radicals with strong oxidizing power when exposed to ultraviolet light, and these radicals may decompose various environmental pollutants present in water or air into harmless carbon dioxide and water. Since titanium dioxide itself does not change even when exposed to light and is chemically very stable, there may be an advantage in that titanium dioxide may be semi-permanently used. Meanwhile, active oxygen ($O_2^-$) or hydroxyl radical (·OH) generated by photoreaction also has functions of sterilizing harmful viruses and bacteria and deodorizing bad odors because it has a higher oxidizing power than that of conventional chlorine ($Cl_2$) or ozone ($O_3$). However, since titanium dioxide is an excellent photocatalyst as a single component material, but has a large energy band gap (e.g., an anatase phase requires a band gap of 3.2 eV), photolysis reaction occurs only by absorbing ultraviolet (UV) light in high energy band ($\lambda \leq 390$ nm). Therefore, when sunlight is irradiated to titanium dioxide, only a small amount of about 3 to 4% of UV-light contained in sunlight may be absorbed by titanium dioxide. Therefore, there are many limitations in directly applying the above-described titanium dioxide material itself to a device for decreasing air pollutants and the like. Therefore, in order to effectively utilize the photocatalyst material in the air purification device, there is a need for systematic research for overcoming various limitations.

In this regard, a method of adsorbing titanium dioxide, which is a photocatalyst material, may use an epoxy resin as a binder on a surface of a long-lasting phosphor powder and a phosphor photocatalyst composite powder by depositing titanium dioxide on the surface of the long-lasting phosphor powder with an atomic layer deposition (ALD) technique. However, when the long-lasting phosphor powder is commercialized as a photocatalytic filter for air purification, the epoxy resin used as the binder is an organic material and decomposed by activated species causing strong chemical reactions such as active oxygen ($O_2^-$) or hydroxyl radical (·OH) generated from the photocatalyst when used for a long period of time, thereby causing a peeling problem of the titanium dioxide powder, and when the atomic layer deposition method is applied, there may be difficulties in mass production as a limited coating technology which may only deposit a small amount of thin film with expensive equipment.

A method of manufacturing a long-lasting phosphor photocatalyst into granular beads and filling the beads in a ventilated metal mesh frame to apply the beads to a photocatalytic filter for air purification may be used, but there is a problem in that the photocatalytic powder is discharged into the indoor air due to collision and friction between the beads when an external force (vibration or the like) is applied to the bead type photocatalytic filter.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

It is an aspect of the present disclosure to provide a technology which may manufacture a long-lasting phosphor-photocatalyst composite with excellent photoactivity and a photolysis function even in a dark environment without light by hybridizing a photocatalyst material, a long-lasting phosphor, and silica and use the long-lasting phosphor-photocatalyst composite as a filter to apply the filter to air purification system equipment such as an air purifier or an air purification device. A composite for air purification may be obtained by combining long-lasting phosphors, silica, and photocatalysts. A high-functionality luminescent photocatalytic filter may improve ambient air quality by photolyzing and removing various air pollutants (harmful gases, volatile organic compounds (VOCs), viruses, odors, and the like) even in a dark space without light as well as an indoor with lighting facilities.

However, an object of the application is not limited to the above-described object, and other objects not mentioned will be clearly understood by those skilled in the art from the following description.

Additional aspects of the disclosure will be set forth in part in the description which follows and, in part, will be obvious from the description, or may be learned by practice of the disclosure.

A composite for air purification may include a porous support, a first coating layer disposed on a surface of the porous support and including a long-lasting phosphor, a second coating layer disposed on a surface of the first coating layer and including silica ($SiO_2$), and a third coating layer disposed on a surface of the second coating layer and including a photocatalyst.

The porous support may be a metal foam.

The long-lasting phosphor may contain at least one selected from the group consisting of $CaAl_2O_4$:(Eu,Nd)- based, $SrAl_2O_4$:(Eu,Dy)-based, $Sr_4Al_{14}O_{25}$:(Eu,Dy)-based, $BaAl_2O_4$:(Eu,Dy)-based, and [Ca,Sr,Ba]—Al—O-based compounds.

The first coating layer may further contain an inorganic binder.

The inorganic binder may include at least one selected from the group consisting of sodium silicate ($Na_2O(SiO_2)_n$), potassium silicate ($K_2O(SiO_2)_n$), glaze, and calcium aluminate ($CaO{\cdot}Al_2O_3$).

The photocatalyst may include at least one selected from the group consisting of titanium dioxide ($TiO_2$), graphite carbon nitride (g-$C_3N_4$), and $TiO_2$/g-$C_3N_4$.

The $TiO_2$/g-$C_3N_4$ may be doped with one or more elements of Fe, Cu, Co, Ni, and N.

A filter may include a composite for air purification. The composite may include a porous support, a first coating layer disposed on a surface of the porous support and including a long-lasting phosphor, a second coating layer disposed on a surface of the first coating layer and including silica ($SiO_2$), and a third coating layer disposed on a surface of the second coating layer and including a photocatalyst.

A method of manufacturing a composite for air purification may include preparing a porous support, forming a long-lasting phosphor coating layer on a surface of the porous support using a long-lasting phosphor slurry, forming a silica ($SiO_2$) coating layer on a surface of the long-lasting phosphor coating layer using a silica sol, and forming a photocatalyst coating layer on a surface of the silica coating layer using a photocatalyst sol.

The long-lasting phosphor slurry may be manufactured by mixing a long-lasting phosphor powder and an inorganic binder, and the long-lasting phosphor coating layer may be formed by spray coating using the long-lasting phosphor slurry.

The long-lasting phosphor powder may include at least one selected from the group consisting of $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, and [Ca,Sr,Ba]—Al—O-based compounds, and the inorganic binder may include at least one selected from the group consisting of sodium silicate ($Na_2O(SiO_2)_n$), potassium silicate ($K_2O(SiO_2)_n$), glaze, and calcium aluminate ($CaO{\cdot}Al_2O_3$).

The method may further include heat-treating the long-lasting phosphor coating layer at 600 to 1,000° C. under a hydrogen reducing atmosphere.

The silica sol may be manufactured by mixing a Si precursor, an alcoholic solution, and an acid solution, and the silica coating layer may be formed by dip coating or spray coating using the silica sol.

The Si precursor may be tetraethyl orthosilicate (TEOS).

The photocatalyst sol may be manufactured by mixing a photocatalyst precursor, an alcoholic solution, and an acid solution, and the photocatalyst coating layer may be formed by dip coating or spray coating using the photocatalyst sol.

The photocatalyst precursor may include at least one selected from the group consisting of a Ti precursor, graphite carbon nitride (g-$C_3N_4$), and combinations thereof, and the Ti precursor may include at least one selected from the group consisting of $Ti(OCH(CH_3)_2)_4$, $(C_4H_9O)_4Ti$, $Ti(OCH_2CH_3)_4$, $((CH_3)_2CHO)_2Ti(C_5H_7O_2)_2$, and $Ti(OCH_3)_4$.

The method may further include heat-treating the photocatalyst coating layer at 300 to 600° C. for 2 to 8 hours. These and other features and advantages are described in greater detail below.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a scanning electron microscope (SEM) microstructure photograph of the composite for air purification;

FIG. 6 is a graph showing toluene decomposition efficiency when there is no light source (dark field of view) in an Example according to the present disclosure and a Comparative Example.

DETAILED DESCRIPTION

Figure 1:
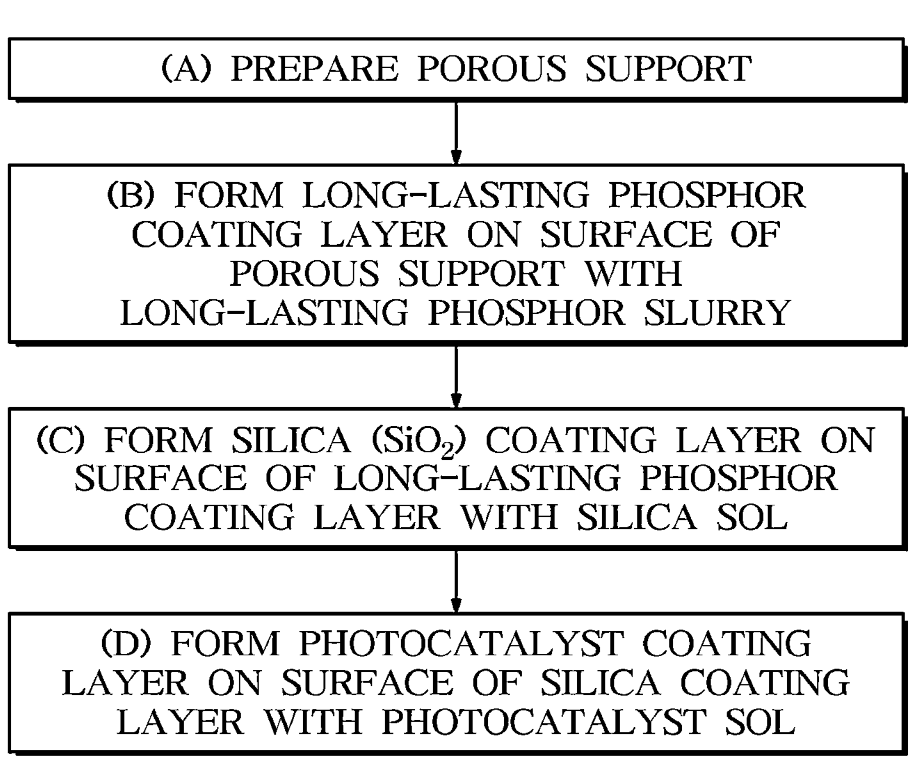
FIG. 1 is a flowchart schematically showing a method of manufacturing a composite for air purification.

Hereinafter, various examples of the present disclosure will be described. However, the aspects of the present disclosure may be modified in various other forms, and the technical spirit of the present disclosure is not limited to the examples described below. In addition, the examples of the present disclosure are provided to more completely describe the present disclosure to those skilled in the art.

The terms used in the application are only used to describe specific examples. Therefore, for example, a singular expression includes a plural expression unless the context clearly requires it to be singular.

It should be noted that terms such as "comprises" or "includes" used in the application are used to clearly specify that the features, steps, functions, components, or combinations thereof described in the specification are present and are not intended to be used to preliminarily preclude the presence of other features, steps, functions, components, or combinations thereof.

Meanwhile, unless otherwise defined, all terms used herein should be regarded as having the same meaning as commonly understood by those skilled in the art to which the present disclosure pertains. Therefore, unless explicitly defined herein, specific terms should not be construed in an unduly idealistic or formal sense. For example, in the specification, a singular expression includes a plural expression unless the context clearly dictates otherwise.

In the specification, "about", "substantially", and the like are used in or as the meaning close to the numerical value when manufacturing and material tolerances inherent in the stated meaning are presented and are used to prevent a unconscionable infringer from unreasonably using the disclosed contents in which accurate or absolute values are described to help the understanding of the present disclosure.

Terms including ordinal numbers, such as "first" and "second", are used to distinguish one component from another element and do not limit the one component.

Terms such as "~unit," "~group," "~block," "~member," and "~module" may refer to a unit for processing at least one function or operation.

In performing a method or a manufacturing method, each process constituting the method may be performed differently from a specified order unless the specific order is clearly described in context. In other words, each process may also be performed in the same as the specified order, may also be performed substantially at the same time, or may also be performed in a reverse order.

Hereinafter, the present disclosure will be described in more detail.

A composite for air purification may include a porous support, a first coating layer disposed on a surface of the porous support and containing a long-lasting phosphor, a second coating layer positioned on a surface of the first coating layer and containing silica ($SiO_2$), and a third coating layer positioned on a surface of the second coating layer and containing a photocatalyst.

The composite for air purification may include a photocatalyst coating layer, a long-lasting phosphor coating layer, and a long-lasting phosphor-photocatalyst hybrid composite containing a silica coating layer bonding the photocatalyst coating layer and the long-lasting phosphor coating layer.

The composite for air purification may include the porous support. The porous support may be a ventilated metal foam, and for example, the metal may include one or more selected from the group consisting of Fe, Ni, Cu, Zn, and combinations thereof.

The composite for air purification may include the first coating layer coated on the surface of the porous support. The first coating layer has a thick film structure strongly bonded to the surface of the porous support at a uniform thickness and contains the long-lasting phosphor, and thus light absorbed by the long-lasting phosphor is re-emitted even in a dark field of view without light, thereby inducing photocatalytic activity to improve the efficiency of photolysis reaction.

As the long-lasting phosphor, any long afterglow long-lasting phosphor material having characteristics of absorbing light and emitting the light may be used without limitation. For example, the long afterglow long-lasting phosphor material may be a phosphorescent material in the form of a powder containing one or more selected from the group consisting of $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, and [Ca,Sr,Ba]—Al—O-based compounds.

The first coating layer may further include an inorganic binder to coat the long-lasting phosphor powder on the surface of the porous support at a uniform thickness. The inorganic binder may contain, for example, one or more selected from the group consisting of sodium silicate ($Na_2O(SiO_2)_n$), potassium silicate ($K_2O(SiO_2)_n$), glaze, and calcium aluminate ($CaO \cdot Al_2O_3$). The sodium silicate and the glaze are mixed at a volume ratio of 1:1, but aspects of the present disclosure are not limited thereto.

The composite for air purification may include the second coating layer coated on the surface of the first coating layer and functions to increase the adhesion of photocatalytic particles coated on a surface of the long-lasting phosphor. The second coating layer may be coated with silica ($SiO_2$) particles crystallized by a sol-gel method.

The composite for air purification may include the third coating layer coated to surround the surface of the second coating layer in the form of nanoparticles and/or nano-thin film. The third coating layer may include a photocatalyst and thus, not only general ultraviolet and/or visible rays but also the light re-emitted after absorbed by the long-lasting phosphor in a dark field of view without light may also function as a light source for photocatalytic activation.

The photocatalyst may be used without limitation as long as it is a material having the characteristics in which photoactivation occurs and various organic substances or harmful gas substances are photolyzed when light such as sunlight is absorbed. For example, the photocatalyst may contain one or more selected from the group consisting of titanium dioxide ($TiO_2$), graphite carbon nitride (g-$C_3N_4$), and $TiO_2$/g-$C_3N_4$ which is a hybrid material thereof, and specifically, $TiO_2$/g-$C_3N_4$ may be doped with one or more elements of Fe, Cu, Co, Ni, and N.

The third coating layer contains $TiO_2$ of a anatase phase crystallized by the sol-gel method.

FIG. 1 is a flowchart schematically showing a method of manufacturing the composite for air purification.

Referring to FIG. 1, a method of manufacturing a composite for air purification may include operations of: (a) preparing a porous support; (b) forming a long-lasting phosphor coating layer on a surface of the porous support using a long-lasting phosphor slurry; (c) forming a silica ($SiO_2$) coating layer on a surface of the long-lasting phosphor coating layer using a silica sol; and (d) forming a photocatalyst coating layer on a surface of the silica coating layer using a photocatalyst sol.

In the method of manufacturing the composite for air purification, some or all of the contents described for the composite for air purification may be applied, and detailed descriptions of overlapping portions have been omitted, but the descriptions may be applied in the same manner even when omitted.

In an example, the porous support may be prepared (e.g., in operation (a)).

The porous support may be a metal foam, and the metal may include, for example, one or more selected from the group consisting of Fe, Ni, Cu, Zn, and combinations thereof.

The long-lasting phosphor coating layer may be formed on the surface of the porous support using the long-lasting phosphor slurry (e.g., in operation (b)).

The long-lasting phosphor slurry may be prepared by mixing a long-lasting phosphor powder and an inorganic binder and the long-lasting phosphor coating layer may be formed by spray coating using the long-lasting phosphor slurry.

The long-lasting phosphor may be uniformly coated on the porous support at a thickness of several tens to hundreds of micrometers by a method such as a spray injection which passes the long-lasting phosphor slurry through a spray nozzle having an appropriate diameter and drying the long-lasting phosphor in a dry oven after coating the long-lasting phosphor.

The long-lasting phosphor powder may be used without limitation as long as it is a material having the characteristics of absorbing light and emitting the light and may contain, for example, $CaAl_2O_4$:(Eu,Nd)-based, $SrAl_2O_4$:(Eu,Dy)-based, $Sr_4Al_{14}O_{25}$:(Eu,Dy)-based, $BaAl_2O_4$:(Eu,Dy)-based, and [Ca,Sr,Ba]—Al—O-based compounds, and $Sr_4Al_{14}O_{25}$:(Eu,Dy)-based compound may be used.

For example, the inorganic binder may contain one or more selected from the group consisting of sodium silicate ($Na_2O(SiO_2)_n$), potassium silicate ($K_2O(SiO_2)_n$), glaze, and calcium aluminate ($CaO \cdot Al_2O_3$) and a mixture of $Na_2O(SiO_2)_n$ or $K_2O(SiO_2)_n$ and the glaze may be used as the inorganic binder.

Heat-treating (sintering) the long-lasting phosphor coating layer may be performed at about 600 to 1000° C. under a hydrogen reducing atmosphere so that the long-lasting phosphor coated on the surface of the porous support is solidly condensed and light is emitted with high brightness.

Despite the above description, the method of manufacturing the long-lasting phosphor slurry and the method of coating the same may not be necessarily limited to the above-described examples. As long as the requirement of the form of the long-lasting phosphor coating film is satisfied, various other methods may be applied.

A silica ($SiO_2$) coating layer may be formed on the surface of the long-lasting phosphor coating layer using the silica sol (e.g., in operation (c)).

The silica sol may be manufactured by hydrolysis by mixing a Si precursor, an alcohol-based solution, and an acid solution and forming the silica coating layer by dip coating or spray coating using the silica sol.

For example, the Si precursor may include tetraethyl orthosilicate (TEOS), the alcohol-based solution may include methanol, ethanol, propanol, and the like, and the acid solution may include hydrochloric acid, nitric acid, and the like.

The hydrolysis reaction may be conducted under magnetic stirring for about 2 to about 4 hours, and a small amount of additives (e.g., pluronic P123) may be further contained.

The silica particles may be crystallized by drying the silica ($SiO_2$) coating layer formed by the dip coating or spray coating at about 80 to about 120° C., e.g., at about 100° C. and heat-treating the silica ($SiO_2$) coating layer may be performed at about 300 to about 600° C., e.g., at about 450° C. for about 2 to about 5 hours.

The forming of the photocatalyst coating layer on the surface of the silica coating layer may be performed by applying at least one of: a sol-gel method, a hydrothermal process method, and a chemical vapor deposition method (CVD), but may be performed by the sol-gel method which forms the photocatalyst coating layer on the surface of the silica coating layer using the photocatalyst sol (e.g., in operation (d)). At this time, the photocatalyst coating layer may be coated to surround a surface of a long-lasting phosphor-silica double coating layer in the form of nanoparticles and nano-thin films.

The photocatalyst sol may be manufactured by hydrolysis by mixing a photocatalyst precursor, an alcohol-based solution and the acid solution and forming the photocatalyst coating layer by the dip coating or spray coating using the photocatalyst sol (e.g., in the operation (d)). When manufacturing the photocatalyst sol, a thickness of the photocatalyst coating layer may be controlled by adjusting the amount of the acid solution.

The photocatalyst precursor may include one or more selected from the group consisting of a Ti precursor, graphite carbon nitride ($g\text{-}C_3N_4$), and combinations thereof.

The Ti precursor may be used without limitation as long as it may coat the titanium dioxide film, and may contain, for example, one or more selected from the group consisting of titanium isopropoxide ($Ti(OCH(CH_3)_2)_4$), tetra butyl titanate (TBOT; $(C_4H_9O)_4Ti)$)), tetra alkoxy titanium ($Ti(OCH_2CH_3)_4$), $((CH_3)_2CHO)_2Ti(C_5H_7O_2)_2$, and $Ti(OCH_3)_4$.

Heat-treating the photocatalyst coating layer may be performed at about 300 to about 600° C., e.g., about 300 to about 500° C. for about 2 to about 8 hours. For example, the Ti-sol coated by the heat treatment may be crystallized into $TiO_2$ of the anatase phase having photocatalytic characteristics.

Figure 2A:
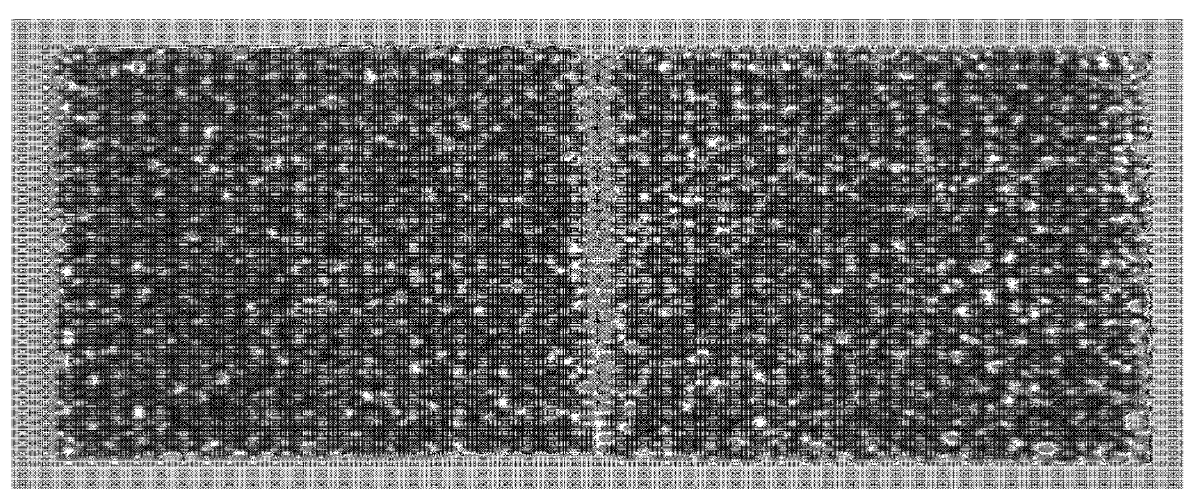
FIG. 2A is a photograph of a metal foam before coating.
Figure 2B:
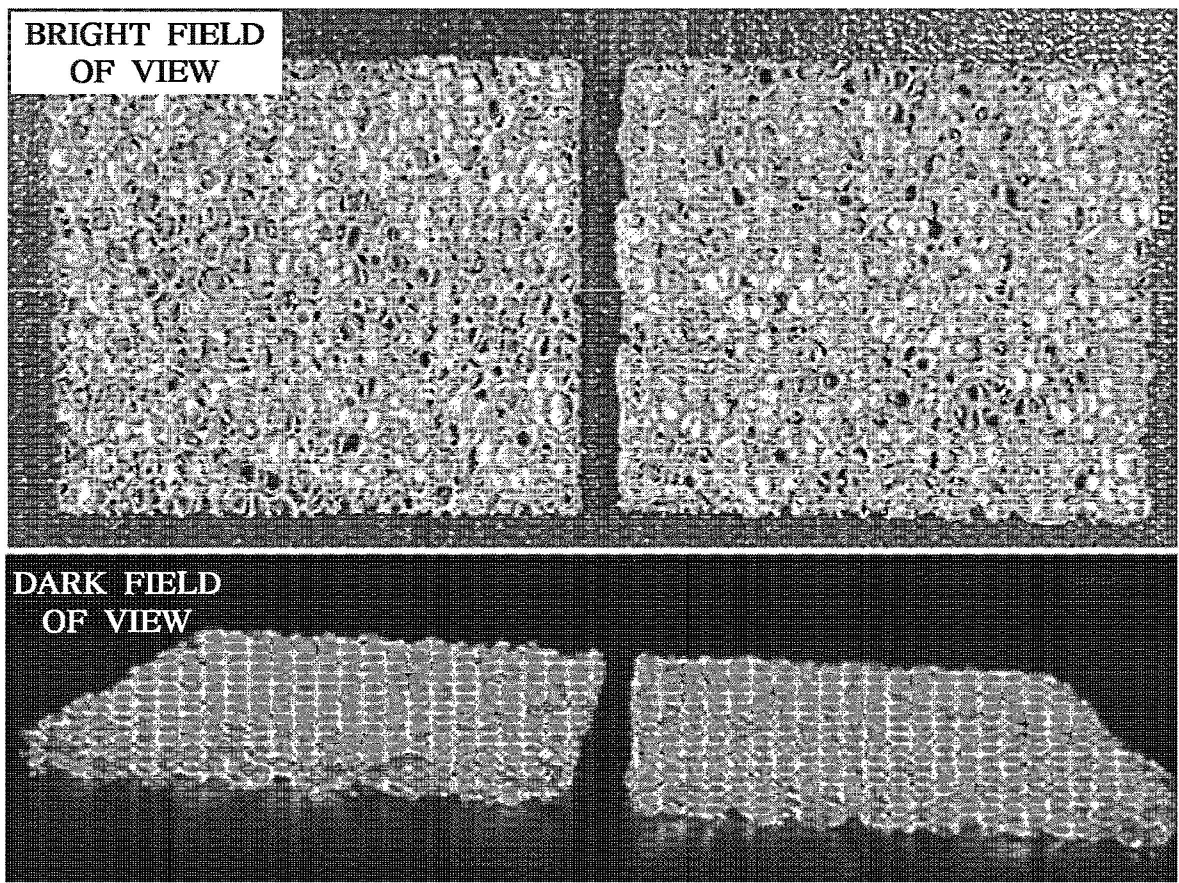
FIG. 2B is a photograph (top) of the composite for air purification when there is a light source (bright field of view) and a photograph (bottom) of the composite for air purification when there is no light source (dark field of view)

FIG. 2A shows the metal foam before coating, and FIG. 2B shows photographs (bright field of view and dark field of view environments) of the composite for air purification manufactured by the above-described method. The metal foam coated with the photocatalyst-long-lasting phosphor material may generate a high reactive radical (hydroxy group ion, active oxygen species, and the like) in which the photoactivation of the photocatalyst material occurs due to ultra-rays or visible rays irradiated from the outside and pollutants, such as harmful gases and organic substances, in the atmosphere may be decomposed. Meanwhile, the long-lasting phosphor, which is one of the components of the coating layer, may be excited by light such as sunlight irradiated from the outside, light is emitted by de-excitation, and the photocatalyst material present on the surface is photo-activated by the light. Therefore, an additional photolysis reaction of pollutants may occur in this process. By the additional photolysis reaction, the composite for air purification according to the present disclosure can greatly increase the efficiency of the photolysis reaction of the photocatalyst. Meanwhile, since the composite for air purification has good ventilation, it may be easily mounted on frames of various shapes according to the specifications of components and used as a filter for air purification.

It may be possible to mass-produce a filter module for an air purification system by manufacturing the composite for air purification by the coating using the sol-gel method.

According to the composite for air purification of the present disclosure, the titanium dioxide and graphite carbon nitride photocatalyst material layer may be activated by visible rays as well as ultraviolet rays and the efficiency of the photolysis reaction may be improved by the photocatalyst material layer because not only ultraviolet or visible rays irradiated from the outside but also the light re-emitted after already absorbed by the long-lasting phosphor may function as a light source for activating the photocatalyst of the photocatalyst material layer.

A high-functionality luminescent photocatalytic filter which may improve ambient air quality may be produced by manufacturing the long-lasting phosphor photocatalyst material obtained by combining the long-lasting phosphor, the silica, and the photocatalyst material and photolyzing and removing various air pollutants, for example, harmful gases, volatile organic compounds (VOCs), viruses, odors, and the like even in a dark space without light as well as an indoor with lighting facilities using the material.

A filter may include the composite for air purification. In the filter according to the present disclosure, all of the contents described with respect to the composite for air purification and the method of manufacturing the same may be applied, and detailed descriptions of overlapping portions have been omitted, but the descriptions may be applied in the same manner even when omitted.

In the filter including the composite for air purification obtained by combining the long-lasting phosphor, the silica, and the photocatalyst material, the activity of the photocatalyst may highly occur even under ultraviolet (UV) rays and visible rays, and the activity of the photocatalyst may occur due to the light emitted from the long-lasting phosphor in the dark field of view without light. Therefore, it may be possible to have the purification function of photolyzing and removing air pollutants, for example, harmful gases, volatile organic compounds (VOCs), viruses, odors, and the like not only in the indoor with lighting facilities but also in the dark space without light, thereby exerting the excellent efficiency of the photolysis. It may be possible to provide the advantage in that the filter is mounted as the filter product of the commercial air purification system and also easy to be used.

The filter module for air purification having a required size may be manufactured without difficulty by appropriately coating the long-lasting phosphor and the photocatalyst on the inner side and outer side of the porous support frame which is a thin metal foam. The method of manufacturing the filter module may provide the advantage in that a filter having a size and various shapes suitable for an inner side of an air purifier may be easily manufactured because a metal foam with high flexibility is used.

Hereinafter, the present disclosure will be described in more detail with various examples. However, the following examples are to describe the present disclosure in more detail, and the scope of the present disclosure is not limited by the following examples.

Example: Manufacturing $TiO_2$—$SiO_2$—$Sr_4Al_{14}O_{25}$:(Eu,Dy)/Fe—Ni Composite A $TiO_2$—$SiO_2$—$Sr_4Al_{14}O_{25}$:(Eu,Dy)/Fe—Ni composite sample coated with a long-lasting phosphor-photocatalyst was manufactured by manufacturing a long-lasting phosphor slurry to coat the slurry on a porous Fe—Ni metal foam (45 mm×45 mm), manufacturing a silica sol to coat silica on a surface of a long-lasting phosphor coating layer, manufacturing a photocatalyst sol to coat the photocatalyst on a surface of a silica coating layer, and performing the heat treatment.

To coat the long-lasting phosphor on the Fe—Ni metal foam, the slurry was manufactured by mixing $Sr_4Al_{14}O_{25}$:(Eu,Dy) long-lasting phosphor powder in a solution, obtained by mixing a sodium silicate solution ($Na_2O(SiO_2)_n$) and a glaze at a volume ratio of about 1:1, at a weight ratio of about 1:10. After the slurry was coated on the metal foam by spray injection, the metal foam was dried in a dry oven at about 100° C. and heat-treated in a hydrogen reducing atmosphere at about 600° C.

Subsequently, to coat the silica on the long-lasting phosphor coating layer, the Si-sol was manufactured by hydrolyzing tetraethyl orthosilicate (TEOS) under magnetic stirring with ethanol, HCl, and deionized water using the tetraethyl orthosilicate (TEOS) as a Si precursor. At this time, a molar ratio of TEOS:ethanol:$H_2O$:HCl was about 1:3:11.05:0.5. The Si-sol solution was spray-coated on the surface of the long-lasting phosphor coating layer, dried at about 100° C., and then heat-treated at about 450° C. for about 4 hours to crystallize $SiO_2$.

Subsequently, a titanium dioxide photocatalyst coating layer was formed on the surface of the silica coating layer using a sol-gel method. The titanium sol (Ti-sol) for coating the titanium dioxide was manufactured by mixing and stirring a titanium tetraisopropoxide (TTIP) solution with ethanol, a nitric acid solution, and distilled water. TTIP:ethanol:distilled water:nitric acid:ethanol was sufficiently mixed at a molar ratio of about 1:20:1:0.35:1 and then maintained at room temperature for about 24 hours so that Ti-sol with milk-like viscosity was produced. The Ti-sol was filled in a spray injector, coated and dried by being sprayed on the surface of the metal foam coated with the $SiO_2$-long-lasting phosphor, and then heat-treated at about 450° C. so that titanium dioxide crystal particles were produced.

Figure 3:
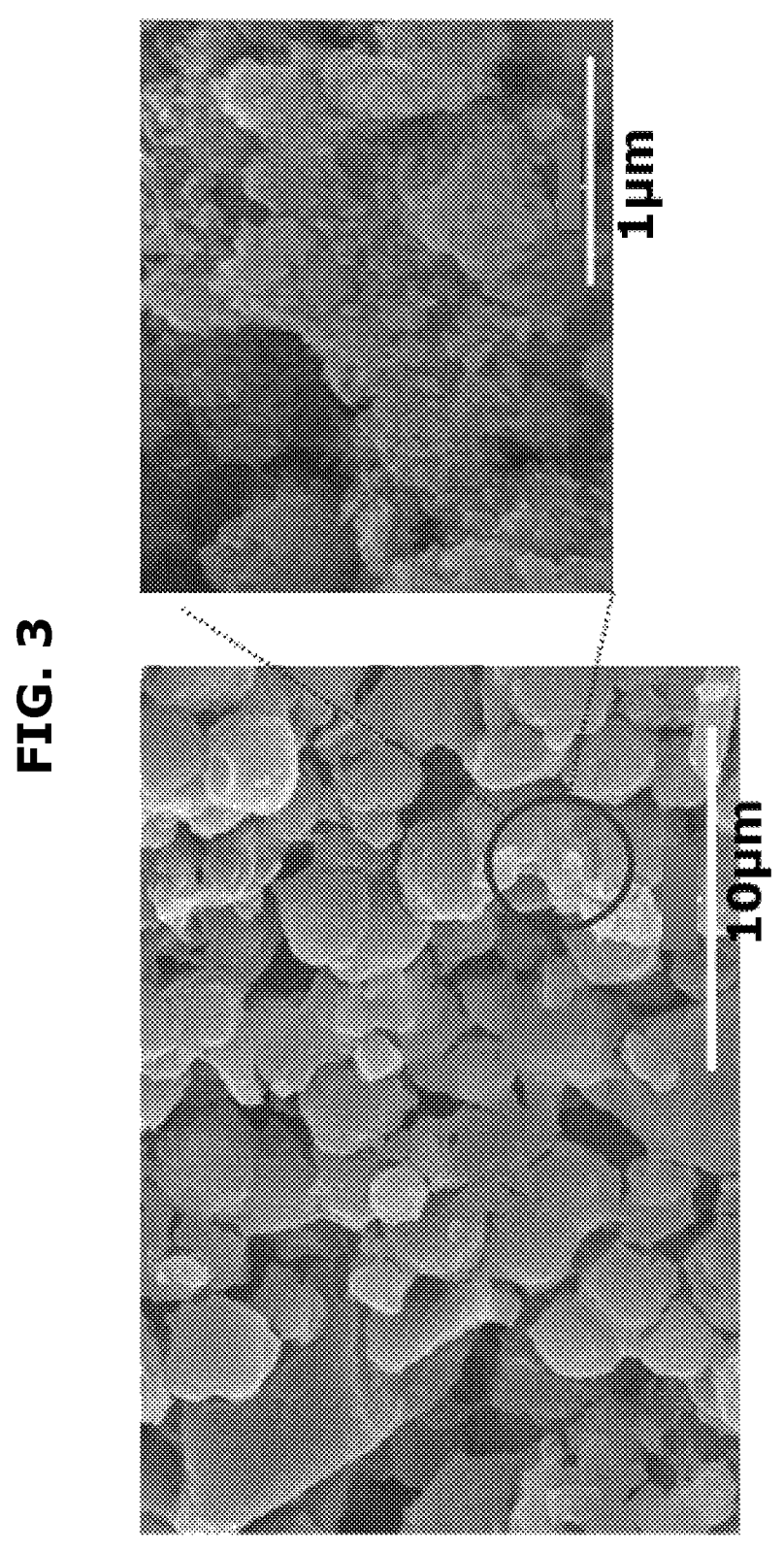

FIG. 3 is a photograph of collecting and observing the surface of the photocatalyst ($TiO_2$) of the $TiO_2$—$SiO_2$—$Sr_4Al_{14}O_{25}$:(Eu,Dy)/Fe—Ni composite-silica ($SiO_2$)—the long-lasting phosphor ($Sr_4Al_{14}O_{25}$:Eu,Dy) coating layer manufactured in the Example using a scanning electron microscope (SEM). As shown in the micro-structure photograph (right) observed at high magnification, it can be confirmed that nano-sized ultra-fine titanium dioxide particles are uniformly coated on the surface of the $SiO_2$—the long-lasting phosphor coating layer.

Comparative Example: Manufacturing $TiO_2$—$SiO_2$/Fe—Ni Composite

As a Comparative Example, a $TiO_2$—$SiO_2$/Fe—Ni composite sample was manufactured in the same manner as in the Example except that the long-lasting phosphor was not coated.

a specimen coated with a dense titanium dioxide film having a certain thickness (about several tens to hundreds of nm) was manufactured by coating inner and outer surfaces of an Fe—Ni metal foam (45 mm×45 mm), which is a porous support, with silica sol and titanium dioxide sol solutions manufactured under the same conditions as in the Example, respectively, and then heat-treating the coated inner and outer surfaces of the Fe—Ni metal foam.

The sample in the Comparative Example may be one of methods similar to the conventional technique used as the photocatalytic filter for air purification.

Experimental Example: Evaluation of Photolysis Reaction

As a light source, an incandescent light bulb (100 W-white light lamp, emitting visible rays having a wavelength of 410 nm or more) to which an UV filter was attached in order to block an ultraviolet region and an ultraviolet light emitting diode (LED) lamp in a wavelength band of about 280 to about 360 nm were used. The photolysis experiment was conducted in a measurement system equipped with a gas chromatography (GC) device which may analyze the concentration of toluene molecules. A Teflon gas bag was used as a reaction chamber in which photoreaction occurs, a photocatalytic filter sample was placed at the bottom of the chamber, and a toluene gas was injected so that a concentration in the reaction chamber became 10 ppm. In a toluene gas analysis unit, the toluene gas was collected from the reaction chamber with a syringe for each time period when the photolysis reaction was conducted, and injected into the GC analysis device, and a change in the concentration of the toluene gas was confirmed by measuring a gas chromatogram.

(1) Comparison of Photolysis Performance for Ultraviolet Rays

Figure 4:
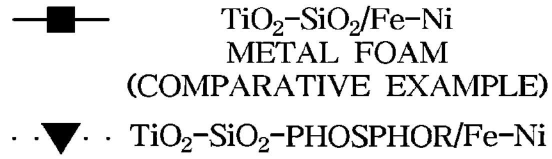
FIG. 4 is a graph showing toluene decomposition efficiency when ultraviolet rays are irradiated in Examples and Comparative Examples.
Figure 4:
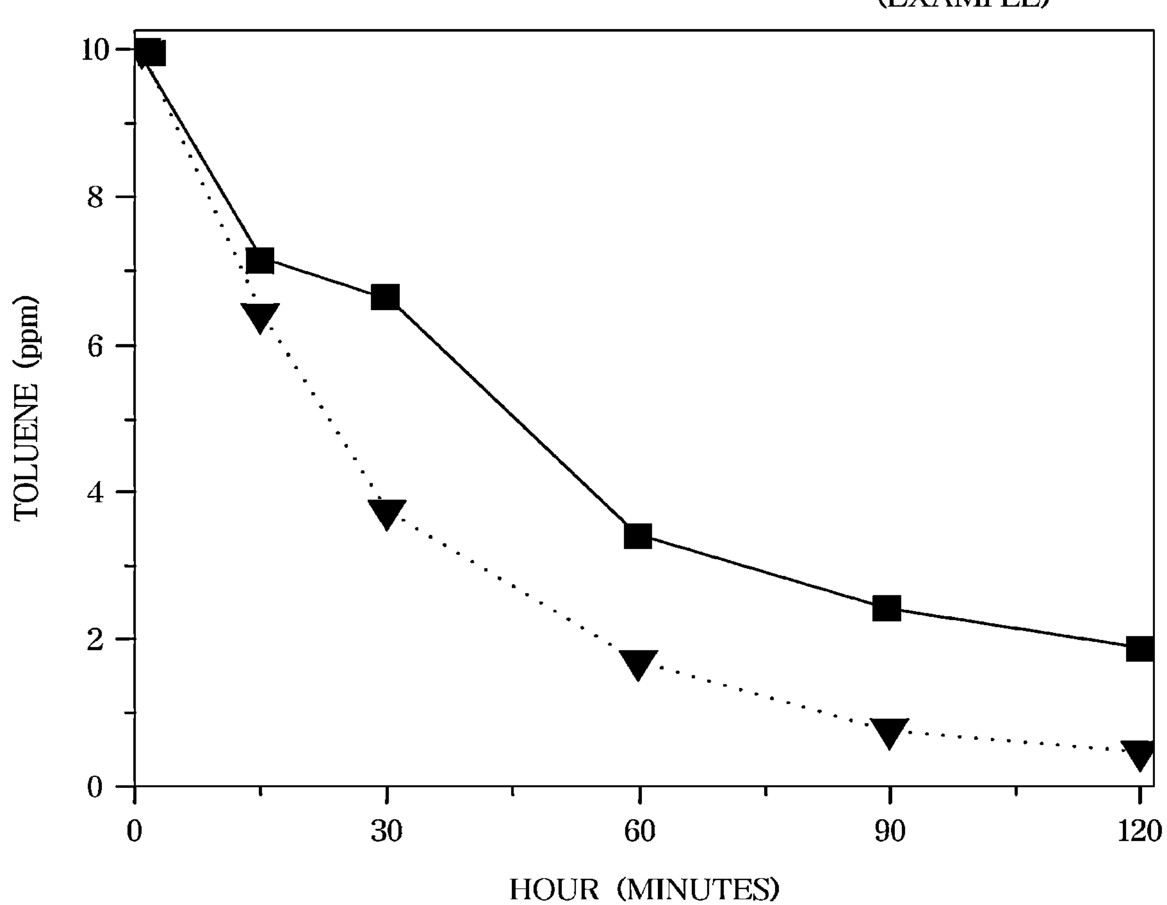

FIG. 4 is a graph showing the results of measuring a photodecomposition rate of the toluene gas in each of a sample in an Example and a sample in a Comparative Example when the sample in the Example [Fe—Ni metal foam filter coated with photocatalyst ($TiO_2$)-silica ($SiO_2$)-long-lasting phosphor ($Sr_4Al_{14}O_{25}$:(Eu,Dy))] according to the present disclosure and the sample in the Comparative Example [Fe—Ni metal foam filter coated with photocatalyst ($TiO_2$)-silica ($SiO_2$)] were irradiated with ultraviolet rays.

Referring to FIG. 4, when the two samples were irradiated with ultraviolet rays, the photolysis reaction was conducted relatively quickly in an initial stage and tended to decrease over time. In addition, a photolysis reaction rate of the Example is much faster than that of the Comparative Example, and in the Comparative Example, only about 80% of the toluene gas was photolyzed even after 120 minutes, but in the Example, 95% or more of the toluene gas was photolyzed.

(2) Comparison of Photolysis Performance for Visible Rays

Figure 5:
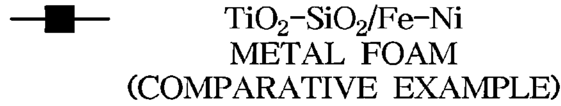
FIG. 5 is a graph showing toluene decomposition efficiency when visible rays are irradiated in Examples and Comparative Examples.
Figure 5:
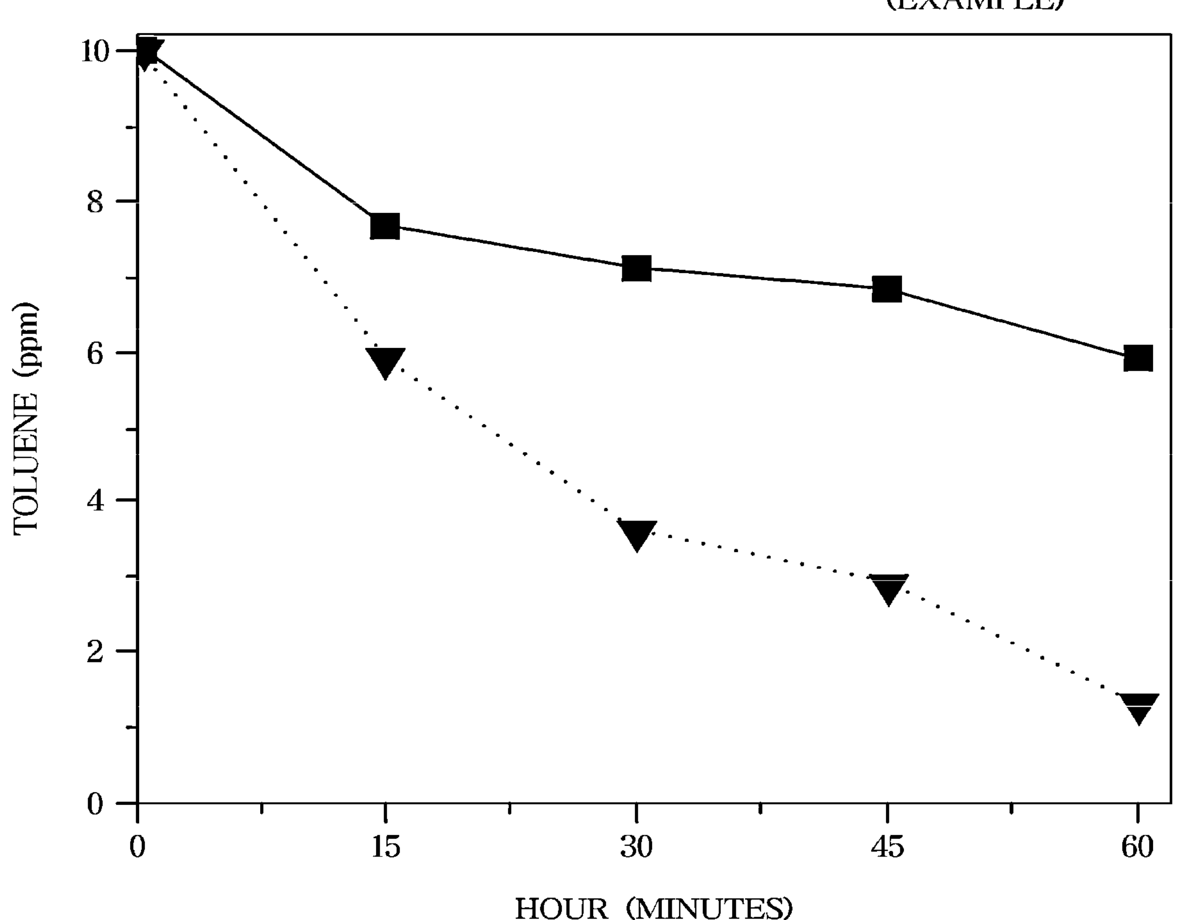

FIG. 5 is a graph showing the results of measuring photodecomposition rates of the toluene gases when the sample in the Example and the sample in the Comparative Example were irradiated with visible rays. The visible rays were irradiated using the white light lamp equipped with the above-described ultraviolet filter.

Referring to FIG. 5, the concentration of the toluene gas was quickly decreased according to the overall reaction time in the sample in the Example, but decreased slowly overall in the sample in the Comparative Example. about 60 minutes after the start of the evaluation, less than about 10% of the toluene gas remained in the sample in the Example, but about 60% or more remained in the sample in the Comparative Example. Therefore, the photocatalytic reaction of the sample in the Example was conducted very actively compared to the sample in the Comparative Example.

Through the experiment result for the photolysis reaction, it was confirmed that the photolysis reaction occurred very quickly in the sample in the Example according to the present disclosure even when irradiated with visible rays as well as ultraviolet rays.

The reason for the phenomenon is not necessarily completely construed by any particular theory, but may be generally construed with the following causes. A mechanism in which the photocatalyst-silica-long-lasting phosphor composite causes photoreaction by the visible light source may be described by the expansion phenomenon of the light absorption wavelength due to the hetero-junction between different wide-bandgap oxide semiconductors. In the $TiO_2$—$Sr_4Al_{14}O_{25}$ composite, $SrTiO_3$ (Eg=3.2 eV, perovskite) which is an intermediate phase at an interface between $TiO_2$ (Eg=3.2 eV, anatase) and $Sr_4Al_{14}O_{25}$ may be generated, and a bending phenomenon of an energy band may occur at a hetero-junction interface between $TiO_2$ and $SrTiO_3$. In other words, different Fermi levels of hetero-materials become the same at the junction interface, and thus the energy band of $TiO_2$ is up-hill-bent and photoactivation is possible even by visible rays ($\lambda$>420 nm), and the energy band bending phenomenon at the interface may cause the $TiO_2$—$Sr_4Al_{14}O_{25}$ composite to undergo active photolysis reaction even under the visible light source.

(3) Comparison of Photolysis Performance Under Dark Field of View Condition

FIG. 6 is a graph showing the results of measuring a photodecomposition rate of a toluene gas in each of the sample in the Example and the sample in the Comparative Example in the dark field of view condition with no light source.

FIG. 6 shows a graph that in the experiment, as for the samples in the Example and the Comparative Example, a switch of a light source was turned on and the samples were irradiated with the visible light source for 5 minutes, and thereafter, the photolysis reaction of the toluene gas in each of the samples was measured for 25 minutes in the dark field of view state in which the switch of the light source was turned off and the light source was blocked, and the photolysis reaction of the toluene gas was represented as the toluene concentration change relationship over time while the switch of the light source was repeatedly turned off after the switch of the light source was turned on for 15 minutes again.

Referring to FIG. 6, the active photocatalytic reaction was conducted in both samples for about 5 minutes when the initial light source was irradiated. However, under the dark field of view condition when the switch of the light source was turned off, the change in the concentration of the toluene gas hardly occurred in the sample in the Comparative Example, but in the sample in the Example, it was shown that the concentration of the toluene gas was continuously decreased and decreased by about 90% or more after about 45 minutes. Therefore, it can be seen that the photocatalytic reaction in the sample in the Example was conducted very actively under the dark field of view condition compared to the Comparative Example.

It is determined that in the photolysis reaction under the dark field of view condition, the photoactivation of the titanium dioxide photocatalyst material has occurred due to the light emitted from the long-lasting phosphor material. In other words, through the photolysis reaction experimental results of the toluene gas, in the Example [Fe—Ni metal foam filter coated with $TiO_2$—$SiO_2$—$Sr_4Al_{14}O_{25}$:(Eu,Dy)] according to the present disclosure, it can be confirmed that the photoactivation of the titanium dioxide is caused by the light emitted from the internal long-lasting phosphor fluorescent material as well as the light source supplied from the outside. Therefore, it can be confirmed that the composite according to the embodiment of the present disclosure has an excellent advantage in that the high photolysis effect can be obtained even in a shady place or a dark field of view without light.

It may also be possible to provide a composite for air purification having excellent photoactivity and a photolysis function even in a dark environment without light by hybridizing a photocatalyst, a long-lasting phosphor, and silica and a filter using the same, and furthermore, apply the filter to an air purification system (e.g., an air purifier or an air purification device).

More specifically, a long-lasting phosphor-photocatalyst composite filter may be manufactured by fixing a long-lasting phosphor-photocatalyst hybrid composite which may emit light even in a dark field of view and has a high photoactive function to a porous support such as a metal foam at an appropriate thickness with strong adhesion and thus the long-lasting phosphor-photocatalyst composite filter may be applied as a filter of a commercial air purification device.

A long-lasting phosphor powder may be mixed with an inorganic binder to make a slurry and then the slurry may be passed through a spray nozzle with an appropriate diameter to uniformly coat the slurry on a metal foam at a thickness of several tens to hundreds of micrometers, and a long-lasting phosphor-photocatalytic filter module may be mass-produced by coating a photocatalyst material on a surface of a coating film of the long-lasting phosphor using a sol-gel method and heat-treating the coated surface at a predetermined temperature.

According to the composite filter of the present disclosure, it may be possible to activate a photocatalyst coating layer, such as titanium dioxide and graphite carbon nitride, by visible rays as well as ultraviolet rays, and furthermore, greatly improve the efficiency of the photolysis reaction by the photocatalyst material layer because the light re-emitted after already absorbed by the long-lasting phosphor may function as a light source activating photocatalyst of the photocatalyst coating layer.

A filter module for air purification may be manufactured with a required size without difficulty by appropriately coating the long-lasting phosphor-photocatalyst material on an inner side and outer side of a support frame formed of a thin porous metal foam (metal foam). In addition, the method of manufacturing the filter module provides the advantage in that a filter having a size and various shapes suitable for an inner side of an air purifier may be easily manufactured because a metal foam with high flexibility is used.

Various examples of the present disclosure address the problems of the conventional photocatalyst material. According to one or more examples of the present disclosure, it may be possible to prevent the separation of photocatalytic particles due to the photochemical reaction of the photocatalyst material by applying an inorganic binder to coat the long-lasting phosphor-photocatalyst composite on the surface of the porous support such as the metal foam and mass-produce the long-lasting phosphor-photocatalytic filter module by coating the photocatalyst material using a spray or dip coating method.

The composite for air purification manufactured according to the present disclosure includes a long-lasting phosphor-photocatalyst hybrid composite containing a photocatalyst such as titanium dioxide, a long-lasting phosphor (light emitting material), and silica bonding the photocatalyst and the light emitting material, and provides a purification function of photolyzing and removing air pollutants because photoactivation may highly occur even under UV light and visible light sources and the photoactivation occurs due to the light emitted from the long-lasting phosphor even in a dark field of view state without light. The filter produced according to one or more examples of the present disclosure may be easily mounted as a filter product of a commercial air purification device because it may be easily coated on the porous support such as the metal foam.

Although various examples of the present disclosure have been described above, aspects of the present disclosure are not limited thereto, and those skilled in the art will be able to understand that various modifications and variations are possible without departing from the concept and scope of the claims described below.

What is claimed is:

1. A composite for air purification comprising:

a porous support;

a first coating layer disposed on a surface of the porous support and comprising a persistent phosphor;

a second coating layer disposed on a surface of the first coating layer and comprising silica (SiO2); and a third coating layer disposed on a surface of the second coating layer and comprising a photocatalyst, wherein the porous support comprises a metal foam, and wherein the first coating layer further comprises an inorganic binder that adheres the persistent phosphor to the metal foam.

2. The composite for air purification of claim 1, wherein the porous support is a Fe—Ni metal foam.

3. The composite for air purification of claim 1, wherein the persistent phosphor comprises at least one of a CaAl2O4:(Eu,Nd) compound, a SrAl2O4:(Eu,Dy) compound, a Sr4Al14O25:(Eu,Dy) compound, a BaAl2O4:(Eu,Dy) compound, and a [Ca,Sr,Ba]—Al—O compound.

4. The composite for air purification of claim 1, wherein the inorganic binder comprises at least one selected from the group consisting of sodium silicate (Na2O($SiO_2$)n), potassium silicate (K2O($SiO_2$)n), or calcium aluminate (CaO·Al2O3).

5. The composite for air purification of claim 1, wherein the photocatalyst comprises at least one selected from the group consisting of titanium dioxide (TiO2), graphite carbon nitride (g-C3N4), and TiO2/g-C3N4.

6. The composite for air purification of claim 5, wherein the TiO2/g-C3N4 is doped with one or more elements of Fe, Cu, Co, Ni, and N.

7. The composite for air purification of claim 1, wherein the first coating layer is formed based on a persistent phosphor slurry, wherein the second coating layer is formed based on a silica sol, and wherein the third coating layer is formed based on a photocatalyst sol.

8. The composite for air purification of claim 1, wherein the third coating layer comprises at least one of nanoparticles or nano-thin films.

9. A filter comprising a composite for air purification, wherein the composite comprises:

a porous support;

a first coating layer disposed on a surface of the porous support and comprising a persistent phosphor;

a second coating layer disposed on a surface of the first coating layer and comprising silica (SiO2); and a third coating layer disposed on a surface of the second coating layer and comprising a photocatalyst, wherein the porous support comprises a metal foam, and wherein the first coating layer further comprises an inorganic binder that adheres the persistent phosphor to the metal foam.

10. The composite for air purification of claim 7, wherein the persistent phosphor slurry comprises persistent phosphor powder and the inorganic binder, and wherein the first coating layer is formed based on spray coating using the persistent phosphor slurry.

11. The composite for air purification of claim 7, wherein the silica sol comprises a Si precursor, an alcoholic solution, and an acid solution, and wherein the second coating layer is formed by dip coating or spray coating using the silica sol.

12. The composite for air purification of claim 11, wherein the Si precursor is tetraethyl orthosilicate (TEOS).

13. The composite for air purification of claim 7, wherein the photocatalyst sol comprises a photocatalyst precursor, an alcoholic solution, and an acid solution, and wherein the third coating layer is formed by dip coating or spray coating using the photocatalyst sol.

14. The composite for air purification of claim 13, wherein the photocatalyst precursor comprises at least one selected from the group consisting of a Ti precursor, graphite carbon nitride (g-C3N4), and combinations thereof.

15. The composite for air purification of claim 14, wherein the Ti precursor comprises at least one selected from the group consisting of Ti(OCH(CH3)2)4, (C4H9O)4Ti, Ti(OCH2CH3)4, ((CH3)2CHO)2Ti(C5H7O2)2, and Ti(OCH3)4.

16. The filter of claim 9, wherein the porous support is a Fe—Ni metal foam.

17. The filter of claim 9, wherein the persistent phosphor comprises at least one of a CaAl2O4:(Eu,Nd) compound, a SrAl2O4:(Eu,Dy) compound, a Sr4Al14O25:(Eu,Dy) compound, a BaAl2O4:(Eu,Dy) compound, and a [Ca,Sr,Ba]—Al—O compound.

18. The filter of claim 9, wherein the inorganic binder comprises at least one selected from the group consisting of sodium silicate ($Na_2O$(SiO2)n), potassium silicate (K2O(SiO2)n), or calcium aluminate (CaO·Al2O3).

19. The filter of claim 9, wherein the photocatalyst comprises at least one selected from the group consisting of titanium dioxide (TiO2), graphite carbon nitride (g-C3N4), and TiO2/g-C3N4.

20. The filter of claim 19, wherein the TiO2/g-C3N4 is doped with one or more elements of Fe, Cu, Co, Ni, and N.

* * * * *